Feb. 15, 1955 V. E. PRATT ET AL 2,701,979
UNIT SYSTEM READER FOR CUMULATIVE MICROFILM AND THE LIKE
Filed July 13, 1951 4 Sheets-Sheet 1

Inventors
Verneur E. Pratt
George F. Gray
By Johnson and Kline
Attorneys

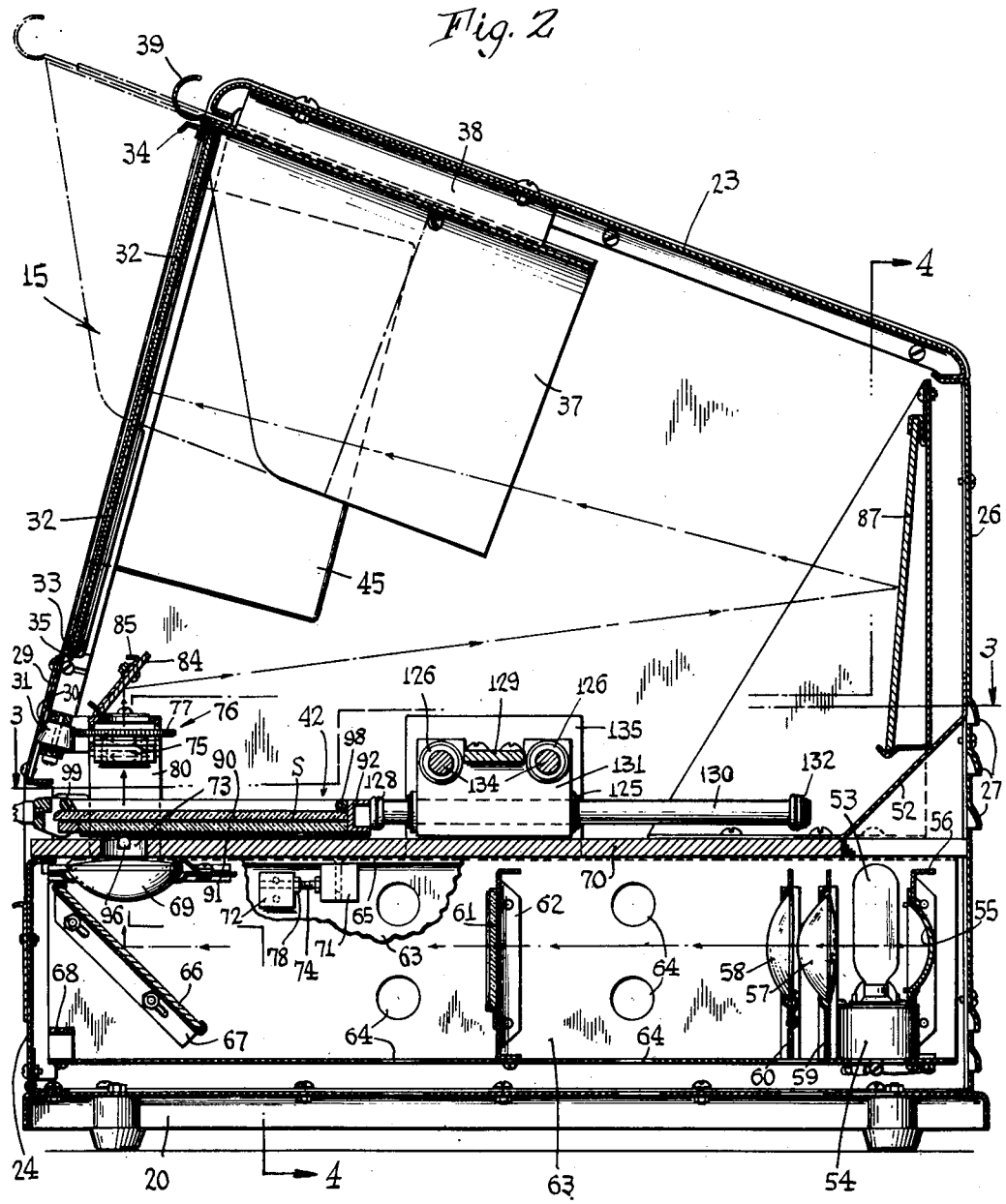

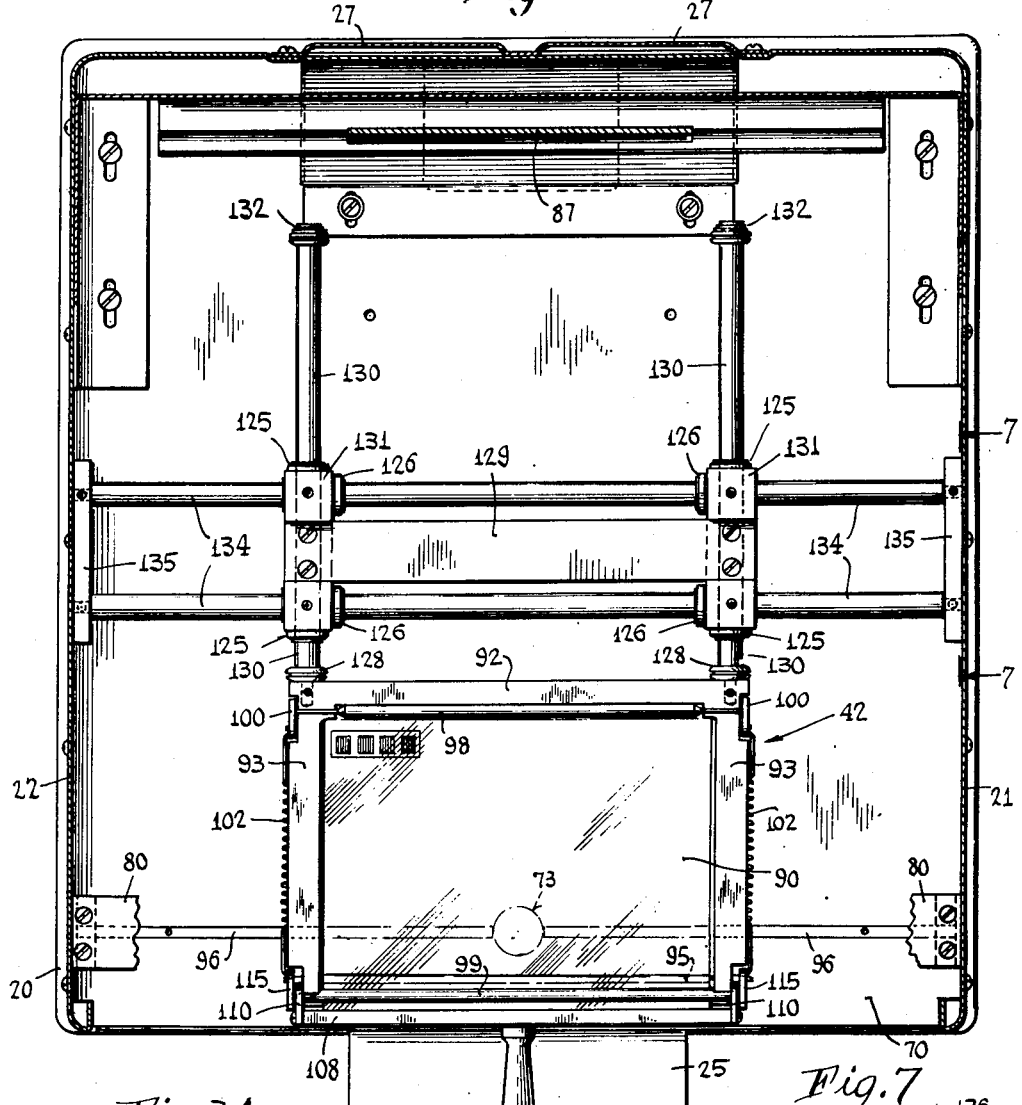

Feb. 15, 1955 V. E. PRATT ET AL 2,701,979
UNIT SYSTEM READER FOR CUMULATIVE MICROFILM AND THE LIKE
Filed July 13, 1951 4 Sheets-Sheet 4
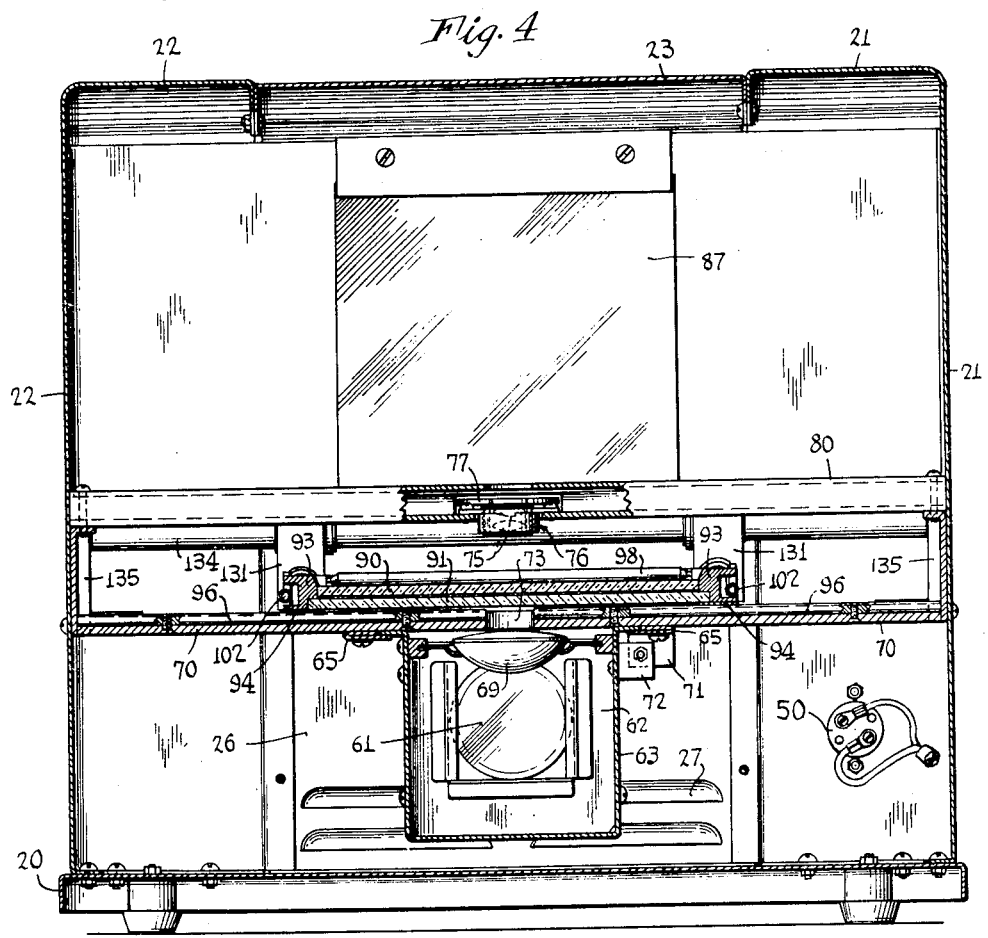
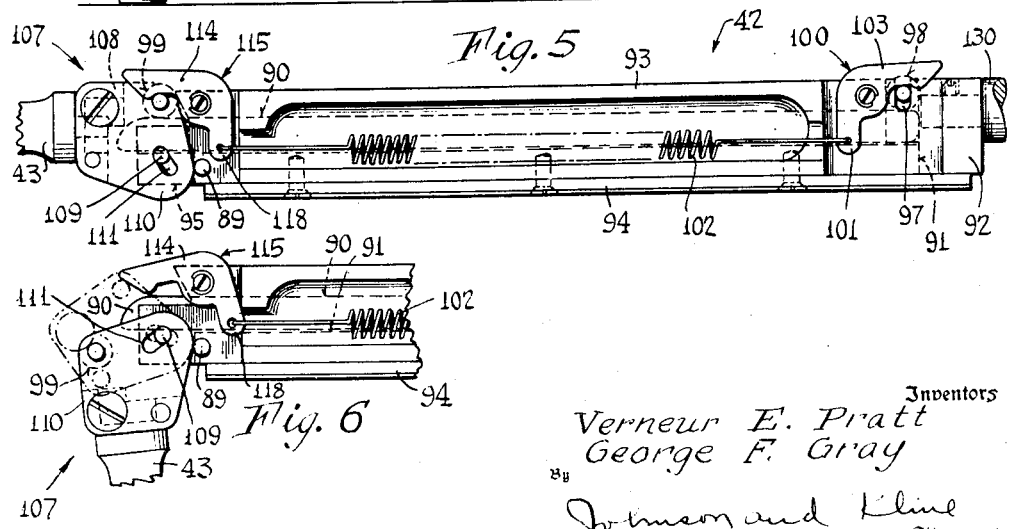
Inventors
Verneur E. Pratt
George F. Gray
By Johnson and Kline
Attorneys

United States Patent Office 2,701,979
Patented Feb. 15, 1955

2,701,979

UNIT SYSTEM READER FOR CUMULATIVE MICROFILM AND THE LIKE

Verneur E. Pratt and George F. Gray, Fairfield, Conn.

Application July 13, 1951, Serial No. 236,582

9 Claims. (Cl. 88—24)

This invention relates to the microfilming art and more particularly to improvements in microfilm readers or viewers by means of which printed matter, data and the like may be presented in enlarged form suitable for reading or observation.

Microfilm records hitherto have been maintained in strip form on spools and are normally read by threading the strip through the projection head of a microfilm reader having an optical system which casts an enlargement of the microfilm image onto a translucent screen or an opaque white surface for viewing by the observer.

Rotation of the spools brings the desired part of the microfilm strip to the projection head where it is magnified by a suitable optical system and projected on the screen in enlarged size for scanning by the viewer.

Numerical, alphabetical or chronological indices are employed to facilitate convenient filing and locating of a particular record of the long continuous ribbon or strip.

If it is desired to consider or compare two microfilm images which are on the same spooled strip with respect to each other, it is necessary to shift back and forth the length of film strip separating them so that each could be viewed in turn for comparison. Inasmuch as the intervening length of film is not definitely known, such shifting would involve considerable hunting back and forth to locate the desired images.

In many situations, such as in hospitals, wherein records made of particular matters occurring at one time must frequently be compared and considered in reference to related matters occurring at other times, microfilm records have not been employed to any great degree, due to the difficulty of bringing together in one place for comparative consideration all the pertinent information. A similar situation exists in the case of the correspondence of business organizations wherein, for example, a complete transaction would comprise several letters of inquiry and responses thereto which would be spaced apart by days or weeks or longer periods of time and would most likely not be on the same spooled strip. Thus, the problem of locating the desired images is further complicated by the fact that now the hunting back and forth will involve several spooled rolls.

Inasmuch as a roll of microfilm is of considerable length and normally contains a large number of images (100 feet of 16 mm. microfilm can contain up to three thousand images of letter-size material), and since each roll would have to be handled every time one particular image thereon was desired each individual roll would be used quite often, where records must be frequently referred to. Considerable marking and scratching of the strips would result as a consequence of such frequent rolling and unrolling of the strip, both because of the manual handling thereof by the operator, as well as the mechanical handling in the viewer, and such attrition might render the record useless.

It is a purpose of the present invention to provide a microfilm reader which is capable of holding and orienting a cumulative microfilm record prepared from a consolidation of related individual microfilm images and which is adapted for projecting all the individual images on a viewing screen for rapid successive visual inspection and consideration.

It is a further purpose of the present invention to provide an improved microfilm reader which obviates the necessity of threading a microfilm through the various parts of the reader and the subsequent winding and rewinding of the spool.

Another purpose of the present invention is to provide a microfilm reader which will protect the microfilm record from wear and tear and scratching or dust damage during use to increase the serviceable life of the microfilm record.

Still another purpose of the present invention is to provide a microfilm reader which will permit the user to scan each and every image by controlling the movement of the composite film record by instant finger-tip control to the image desired to be viewed.

Another feature of the present invention is the provision of efficient and convenient means for holding and orienting a cumulative microfilm record prepared from a consolidation of the individual microfilm images into one convenient accessible unit.

Still other features of the present invention are the simplicity of the microfilm reading device; the speed and convenience whereby all the pertinent matters are presented to the user; and the savings in cost over present multi-record filing systems.

Other purposes and features of the present invention will appear from the following description of a preferred embodiment of the invention, but it is to be understood that the invention is not to be considered limited to the construction disclosed.

In the accompanying drawings:

Fig. 2 is a cross-sectional view of the microfilm reader, taken on a central vertical plane parallel to the sides of the reader.

Fig. 3 is a horizontal cross-section of the microfilm reader, taken on the line 3—3 of Fig. 2.

Fig. 3A is a plan view of a microfilm record sheet such as could be used in the reader of the present invention.

Fig. 4 is a vertical cross-section of the microfilm reader, taken on the line 4—4 of Fig. 2.

Fig. 5 is a side view in detail of the film plate carrier assembly in locked position.

Fig. 6 is a fragmentary side view in detail of the film plate carrier assembly in unlocked position.

Fig. 7 is a fragmentary detail view of the mounting bracket for the transverse slide rods, taken on the line 7—7 of Fig. 3.

Figure 1:
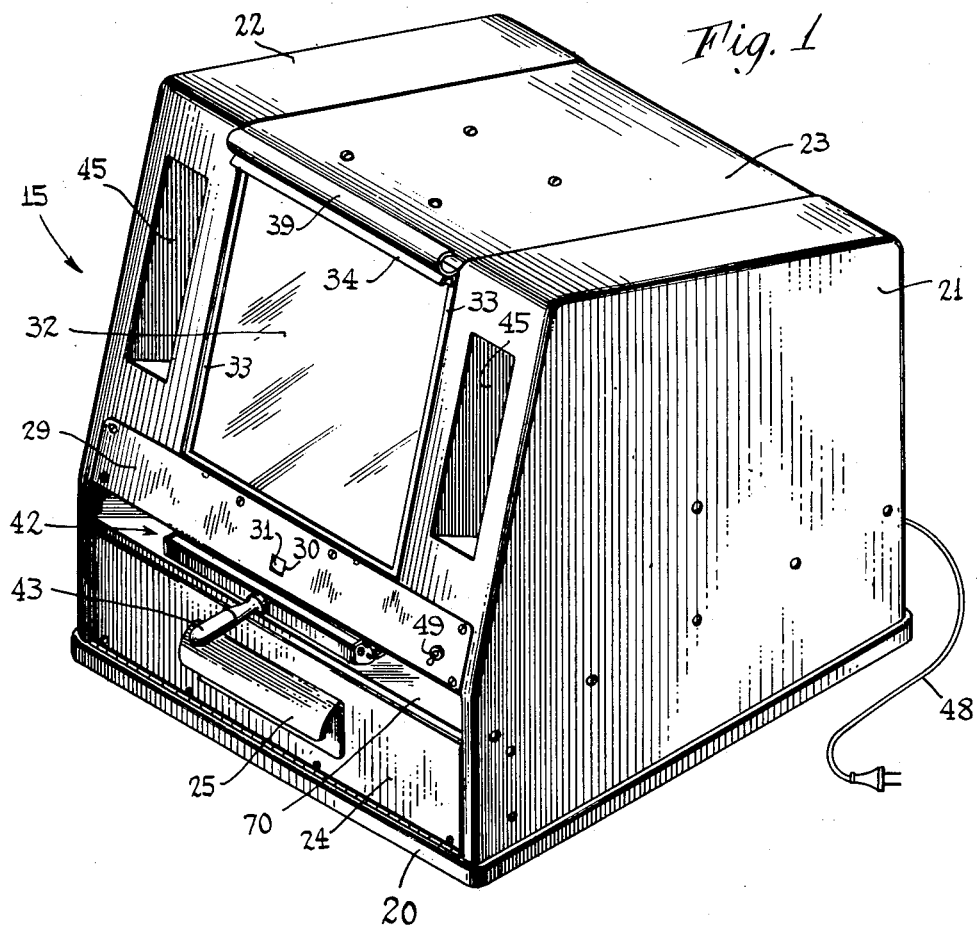
Figure 1 is a perspective view of the microfilm reader of the present invention.

In the preferred embodiment of the present invention shown in the drawings, the microfilm unit reader comprises, as shown in Fig. 1, a casing 15 formed on a base plate 20 upon which are mounted spaced right-hand and left-hand end-boxes 21 and 22 extending upwardly adjacent the sides of the base 20. An inclined top panel or flat plate 23 is provided to enclose the top of the reader and joins the top surfaces of the two end-boxes 21 and 22. A back panel or plate 26, as shown in Fig. 2, is provided to enclose the rear of the unit reader and is secured to the rear surfaces of the end-boxes and to the top panel. A hinged front panel or flat plate 24 is positioned at the lower front portion of the unit reader and has a handle 25 secured thereto whereby the front panel 24 may be swung outwardly and down to permit inspection of the lower inner portion of the unit reader. Suitable locking ball-catches or snaps may be provided for on the hinged front panel whereby it will be retained securely in closed position.

A facing strip or name plate 29 is secured to the front of the end boxes across the front of the reader and braces the same and is provided with a small opening 30 through which a focus wheel or knob 31 protrudes.

A translucent glass, viewing screen 32 is positioned in a screen holder or frame 33 located in an opening in the inclined upper front central portion of the casing of the unit reader and is retained in position by locking ball-catches or snaps (not shown) which hold it in its inclined position for viewing by the user. If desired, the viewing screen may be removed by pulling it angularly outwardly by means of a screen handle 34 which may be integrally formed with the screen frame 33. The viewing screen may be maintained in position by a pair of suitable ball snaps or catches in the upper edge thereof and a pair of pins 35 which are loosely mounted in openings formed in the front portion of the casing, as seen in Fig. 2. Thus, the viewing screen will pivot angularly outwardly on its lower edge for removal by lifting the screen holding pins 35 out of their enlarged openings in the casing.

An adjustable inclined light-shielding hood 37, see Fig. 2, is supported for sliding movement along a hood track support 38 mounted on the inside surface of the top panel. This hood may be moved out of the body of the reader by means of a hand grip 39 to the dotted line position shown in Fig. 2, whereby the space around the viewing screen 32 may be shaded and darkened in order to obtain a sharper and more definite image thereon, as desired.

A space or gap is formed between the front panel 24 and the facing strip 29 and a plate carrier assembly 42 is located therein and may be moved within certain limits in or out of the unit reader or to the right or left therein for a purpose to be described hereinafter. A handle 43 is attached to the front of the plate carrier assembly 42 to facilitate the movements thereof under the control of the user.

Recesses or storage pockets 44 and 45 are provided in the front inclined portions of the end-boxes 21 and 22 and may be conveniently used as receptacles for holding films, cards, data, or other miscellaneous papers, as desired.

A suitable power line or electrical extension cord 48 may be employed to connect the unit reader to a source of electricity and an off-on toggle switch 49 is positioned on the facing strip 29 to enable the user to turn the current off or on, as desired. Suitable connections 50, see Fig. 4, are provided on the rear wall 26 of the reader to supply the necessary current to the electrical elements in the reader.

As shown in Fig. 2, the optical system comprises a projection lamp bulb 53 of the usual type, positioned in a socket 54 and supplied with current through the power cord 48. An angularly positioned baffle plate or chimney 52 is located above the lamp bulb 53 and deflects the heated air arising by convection therefrom through the louvers 27 which are formed in the lower portion of the back plate 26. Inasmuch as the lamp bulb is usually approximately on the order of a 150-watt size, it will be appreciated that ventilation should be provided, especially if the device is to be used continuously for any considerable period of time. Such an arrangement, as provided for herein, will permit the operation of the reader without sufficient rise in temperature as to harm the microfilm or inconvenience the operator. The advantage of such a feature is obvious, particularly in such cases of operation by untrained or inexperienced personnel.

A spherical reflector 55 is positioned in a reflector holder 56 and is so located to the rear of the lamp bulb 53 as to concentrate the light being emitted therefrom forwardly through a first double-convex condenser lens 57 and then through a second plano-convex condenser lens 58 mounted in lens holders 59 and 60, respectively which hold the condenser lenses 57 and 58 in axial optical alignment with the lamp bulb. The light then passes through a circular plate of heat glass 61 held in position by a holder plate 62, so as to be axially aligned with the condenser lenses 57 and 58. The heat glass effectively retards and absorbs the flow of heat from the light source 53 forwardly beyond that point and, since the light source is well in the rear portion of the reader, the front portion of the reader remains comparatively cool. This is an excellent feature of the device since the microfilm is thus positioned well away from any heat and is additionally protected therefrom by the use of this heat-glass barrier.

The lamp socket 54, the reflector holder 56, the lens holders 59 and 60 and the glass holder 62 are mounted on the inside floor panel of a supporting carrier 63 having a rectangular cross-section which is provided with suitable ventilating openings 64 to permit free circulation of air to and around the lamp bulb 53 to prevent overheating thereof and of the adjacent elements. The support or carrier 63 is mounted on a pair of track carriers 65, see Fig. 4, for sliding movement thereon and may be withdrawn from the body of the unit reader for purposes of inspection or maintenance, or returned thereinto as a unit by means of a carrier handle 68. The track carriers 65 are mounted on the underside of a main surface plate or central partition 70 which extends horizontally across the full width of the microfilm reader and prevents the leakage of undesirable light from the lamb bulb 53 into the upper portion of the reader to the rear of the viewing screen 32.

A stop or abutment 71 is fixedly secured to the underside of one of the track carriers 65 and is adapted to adjustably locate the carrier 63 in its innermost position within the reader. A block 72 is secured to the carrier 63 and an adjusting screw 74 is threaded thereinto and secured thereto in an adjusted position by a lock nut 78. It will be appreciated from Fig. 2 how the adjusting screw 74 abuts the fixed block 71 and stops the carrier 63 at the desired position within the body of the reader.

The light passing through the circular heat glass 61 will be directed upon an angularly positioned flat reflector plate or mirror 66 mounted upon an adjustable supporting plate 67 which is secured to the carrier 63 in such a position as to direct the light vertically upwardly through a main double-convex condensing lens 69 and through two double-convex projection lens 75 mounted in a lens carrier assembly 76. An opening 73, see Figs. 2 and 3, is formed in the floor of the surface plate or partition 70 and is located directly between the condensing lens 69 and the projection lens 75 whereby the passage of light into the upper portion of the reader is unrestricted thereat. It will be appreciated that the carrier 63 must be accurately located so that the condenser lens 69 is in optical alignment with the projection lens 75 to insure proper focusing and a clear, sharply defined picture on the screen.

A knurled adjusting wheel 77 is mounted on the upper portion of the lens carrier 76 and may be formed integrally therewith. The lower portion of the lens carrier is externally threaded and cooperates with an internally threaded portion of a lens holder or supporting bracket 80, fixedly secured within the reader whereby the position of the projection lens 75 may be adjustably controlled for focusing purposes.

Consideration of Fig. 2 will reveal that the focus knob or wheel 31 which protrudes through the opening 30 in the facing plate 29 is preferably formed with a rubber outer sleeve and is mounted for rotation in frictional driving contact with the knurled periphery of the adjusting wheel 77. Rotation of the focus wheel 31 by the operator will bring about a corresponding rotation of the adjusting wheel 77 whereby the lens carrier assembly 76 and the projection lens 75 therein will be rotated and advanced upwardly or downwardly by means of its threaded engagement with the internally threaded surface of the fixed lens holder support 80. Thus, focusing of the light coming vertically upwardly through the main condensing lens 69 and the opening 73 is carefully controlled to a fine adjustment.

It is also to be noted that the projection lens 75 is positioned at a considerable distance from the source of light and remain comparatively cool and unaffected by the emission of heat therefrom. The projection lens assembly 76 may, of course, be removed bodily from the reader for inspection, cleaning or replacement.

The light passing through the projection lens 75 is directed onto angularly positioned flat reflecting surface or mirror 84 which is mounted on an adjustable bracket 85. The reflected light is then directed rearwardly in divergent fashion, as a result of the projection lens 75, for substantially the full length of the reader to fall upon a main reflecting surface or mirror 87. Reflection therefrom will then direct the light forwardly and onto the rear surface of the translucent screen 32 for viewing by the user.

The translucent screen 32 preferably comprises two pieces of plate glass or similar material having equivalent optical properties, carefully selected so as to be free of any noticeable bubbles, inclusions, or other optical imperfections. Each piece of glass normally has one surface uniformly ground as fine as possible to a condition such as is used for photographic screens. It is, of course, to be appreciated that the present invention is not to be considered limited to this particular type of screen but that other types may prove substantially as satisfactory.

The plate carrier assembly 42 is provided and is the means for supporting and orienting a microfilm record sheet S in the proper position in the reader to be enlarged and projected on the screen by the optical system. Such a microfilm record sheet is shown in Fig. 3A and comprises a base sheet B of optically clear material to which have been adhered individual transparencies or microfilm strips M. Such a record sheet provides for a facile addition of later accumulated matter whereby a complete matter or transaction may be built up gradually through a period of time, as described in copending application Serial No. 220,550, filed April 12, 1951, wherein is set forth a cumulative unit to be set up and maintained, all on one sheet, and conveniently considered.

As shown in Fig. 3, the plate carrier 42 is a rectangular metallic frame and comprises a rear bar 92, two side bars 93, 93 and a front bar 95. The lower inside corners of the side bars are suitably cut away or notched, as shown in Fig. 4, so as to receive therein a flat transparent plate or bottom platen 91. As shown in Figs. 3 and 3A, the long or transverse axes of the plate carrier 42 and the microfilm sheet S are positioned substantially parallel to the front wall of the reader and are thus parallel to the transverse axis of the viewing screen 32.

A pair of supporting strips 94, 94 as shown in Figs. 4 and 5, preferably made of a synthetic plastic material, are secured to the undersurfaces of the side bars 93, 93 in such a position as to protrude under the inside edges of the bottom plate 91 and to form ledges to retain the bottom glass plate 91 in a firm immovable position in the plate carrier. The lower surfaces of these supporting strips 94, 94 also act as skids for the plate carrier and, during movement thereof, slide on the curved upper surfaces of a pair of circular guide rods 96, 96 which are partially embedded in the horizontal partition 70. This reduces the sliding friction considerably and provides for a smoother and quieter sliding movement of the plate carrier as well as providing for a pair of wear plates at the base thereof. It is also to be noted that rods 96, 96 are positioned in line with the center of the opening 73 in the horizontal partition 70 and thus effectively locate the position of the plate carrier 42 in a horizontal plane relatively with respect to the optical system of the reader and particularly relatively to the projection lens 75 of the reader.

A second flat transparent plate of top platen 90 is provided and is adapted to be placed upon the top surface of the bottom plate 91 and to be resiliently pressed thereagainst by means of a pair of slender hold-down rods 98, 99 which are so positioned as to press down against the top plate 90 adjacent the front and rear edges thereof. The front hold-down rod 99 is adapted to be locked in such position by a locking device 107 pivoted to the side bars 93, 93 and comprising a pair of cam plates 110, a tie bar 108 and a handle 43, as best shown in Fig. 3.

The top and bottom transparent plates 90, 91 are preferably formed of selected plate glass and should be optically flat and free of bubbles, inclusions and other optical imperfections. The plates should also preferably be tempered so as to resist heat and shock. Other materials such as synthetic plastic resins which possess the necessary properties of optical clarity and freedom from imperfections may be used in lieu of the glass plates.

The outer or front hold-down rod 99 has its ends turned down to form narrow pivot pins which are received within circular openings in the cam plates 110, 110 which are secured to the ends of the tie bar 108. As shown in Figs. 5 and 6, the cam plate 110 has an angularly positioned slot 111 formed in a corner thereof and is capable of sliding pivotal movement on a fixed pivot stud 109 which protrudes from the sides of the front bar 95 into the slots 111. Consideration of these figures will reveal how the locking device 107 is moved from a horizontal locking position (Fig. 5), wherein the hold-down rod 99 presses against the top plate 90 and holds it in position, to an open position (Fig. 6), wherein the hold-down rod 99 is removed from the top plate and is swung downwardly and out of the way so that the top plate may be released and raised from the bottom glass plate 91, as desired. It is to be noted that the rear hold-down rod 98 remains unaffected during this locking and unlocking of the front edge of the glass plate 90.

A fixed guide stud 89 protrudes from the ends of the front bar 95 and serves to guide the tie bar 108 and the cam plates 110, 110 in such locking and unlocking movements so that the front hold-down rod 99 will smoothly roll off the curved front edge of the top glass plate 90 and will not bind or stick during such movements.

The inner or rear hold-down rod 98 has its ends tapered and turned down, as shown in Fig. 3, and is positioned in a pair of slots 97 formed in the rear bar 92 so as to be in position to be pressed against the rear portion of the top glass plate 90.

The means for resiliently pressing the hold-down rods against the top glass plate 90 comprises rear and front bell cranks 100 and 115 which are pivotally mounted on fixed studs threaded into and protruding from the side bars 93. With particuluar reference to the rear hold-down rod 98, a horizontally rearwardly extending arm 103 of the bell crank 100 possesses a notch in its lower surface and is adapted to hold and press downwardly against the ends of the hold-down rod 98. This pressure is due to the action of a tension spring 102 which urges a vertically depending arm 101 of the bell crank 100 inwardly of the carrier to tend to rotate the bell crank clockwise, whereby the horizontally extending arm 103 is pressed downwardly against the hold-down rod 98.

With particular reference to the front hold-down rod 99, the similarly constructed bell crank 115 is provided and the tension spring 102 is secured to a vertically depending arm 118 thereof to tend to rotate the same in a counterclockwise direction to cause a horizontally forwardly extending arm 114 to resiliently press against the front hold-down rod 99 to exert locking pressure on the top glass plate 90.

In the use of the plate carrier assembly 42, assuming that it is in the locked horizontal position shown in Fig. 5 and it is desired to insert a microfilm record sheet in the reader for viewing, the handle 43 is grasped and the carrier is moved outwardly of the reader as far as possible. The handle is turned downwardly to move the locking device 107 to an unlocked, free vertical position. In the initial part of this movement, the cam plate 110 pivots on the pin 109 and causes the ends of the hold-down rod 99 to move rearwardly. As a result, the horizontally extending arm 114 of the bell crank is raised initially by an amount equal to the depth of its notch and the bell crank 115 is rotated slightly in a clockwise direction which tends to expand the spring 102 which thus resists the initial movement of the cam plate 110 and hold-down rod 99. Such an arrangement tends to hold the locking device 107 in a locked position and to resist any accidental or inadvertent opening thereof.

During this time, the guide stud 89 compels the cam plate 110 to move rearwardly and thus any binding action between the hold-down rod 99 and the front edge of the top glass plate 90 is avoided.

As soon as the hold-down rod 99 clears the notch formed in the underside of the arm 114 of the bell crank, it is completely free of any restraining force and may be readily moved to the vertical unlocked position of Fig. 6.

During this movement, the slots 111 in the cam plate 110 permit a sliding movement and the cam plate finally reaches the vertical fully open position.

Another purpose in making this pivot opening in the cam plate 110 in the form of an elongated slot 111 is to permit some vertical self-adjusting movement and latitude when returning the cam plate 110 to its final locked position so that it may assume slightly higher or lower positions in the carrier frame to accommodate different thicknesses of material inserted between the transpicuous plates 90, 91 and to be capable of exerting sufficient holding pressure on such material to orient it in a desired horizontal plane with reference to the projecting lenses of the reader. If desired, the forward edge of the lower plate 91 may be beveled or curved in any desired fashion to facilitate the return movement of the hold-down rod to its locked position on the top of the plate 90.

With the locking device 107 in the unlocked position, as shown in Figure 6, the top plate 90 may be removed completely from the carrier frame or merely raised angularly therein, so that the rear or inner portion remains under the rear hold-down rod 98. The microfilm record sheet S may then be inserted between the plates, and the top plate returned to its original position parallel to the bottom plate to press against the inserted sheet S. The locking device 107 is then manually returned to its horizontal locking position wherein the plates will be resiliently urged together to press the microfilm sheet record into a planar configuration therebetween.

It will be appreciated that the microfilm sheet will be well protected from scratching or marking or from dust damage and the like by the flat plates which effectively cover it and guard it against any such undesirable results of frequent handlings. Inasmuch as the record sheet, once encased between the transparent plates, may be handled or used in a reader without any great possibility of damage or injury to the record sheet, its serviceable life is increased many times.

The plate carrier 42 is removably mounted on the ends of a pair of longitudinally spaced parallel support rods 130 which serve as a sliding carriage for the plate carrier 42 and which are machined and finished for a smooth sliding fit within guide bearings 125 mounted in a pair of compound bearing holders 131.

A bracing strip 129 may be provided to tie together and to coordinate the movements of the separate elements of the compound bearing holders 131, so that the holders move together as a unit. Annular rubber bumpers 128 may be loosely positioned on the rods 130 between the plate carrier 42 and the compound bearing holders 131 whereby a cushioning effect is obtained if the two should be brought together.

Consideration of Fig. 3 will make it apparent that the plate carrier 42 and the supporting carriage rods 130 will thus be capable of movement as a unit within the guides 125 in the bearing holders 131 inwardly or outwardly of the body of the reader, that is, parallel to the sides thereof. Lockwashers 132 are snapped into annular indentations near the ends of the supporting carriage rods 130 to limit the outward motion of the plate carrier to prevent it from sliding completely out of the reader. Such an arrangement provides for a smooth sliding movement of the plate carrier in a straight line longitudinally in or out of the reader across the path of the light passing through opening 73.

The compound bearing holders 131 are also provided with guide openings in the upper portions thereof, as shown in Fig. 2, extending at right angles to the guide openings in which the longitudinal carriage rods 130 are mounted. Bearings 126 are provided in these openings to slidably receive therein a pair of spaced parallel transverse supporting guide rods 134. These bearings 126 thus act as a second movable carriage means which are slidable upon the pair of guide rods 134 and are movable with the bearings 125, the carriage slide rods 130 and the carrier 42 as a unit from side to side within the body of the reader.

Rod support brackets 135 are secured to the inner surfaces of the side walls of the end-boxes 21 and 22 and are adapted to receive the ends of the transverse guide rods 134 in elongated openings therein and to adjust and hold the same therein by means of set screws. It is preferable that the guide rods 134 not be locked tightly in place in the brackets 135 but that they be loose and allowed some play whereby the plate carrier will rest naturally with a limited floating movement with the skids 94 resting upon the slide rods 96. In this way, the skid plates 94 will slide thereon for proper positioning and movement of the plate carrier. As a consequence, the openings in the bracket 135 for the rods 134 are preferably in the form of slots. Set screws 136 and 137, see Fig. 7, are provided, one for each slot, and are used for adjustably levelling the sliding rods 130, the rods 134 and the bearing holder 131 for best operation.

Consideration of Fig. 3 will reveal that the plate carrier 42 and the lengthwise rod carriages 130 and the compound bearing holders 131 are thus slidable as a complete unit from side to side on the guide rods 134 within the body of the unit reader parallel to the front and rear walls thereof. This movement is naturally additional and independent to the in-and-out movement of the rods 130 in the bearings 125. As a result, the carrier 42 may be moved universally, that is, laterally with respect to the light passing through the opening 73 in any direction whereby any desired microfilm transparency or any portion of the microfilm placed in the carrier may be brought into the range of the optical system and projected on the viewing screen. Such a movement may be considered universal in direction inasmuch as the carrier may be moved in any direction by combination of these two individual directional components.

It is also to be noted that the record sheet will always be moved in such a manner that it will always be maintained parallel to its initial configuration, that is, the transverse axes of the displaced record sheet will always be moved as to remain in parallelism with the transverse axis of the viewing screen. Thus, the axes of the transparencies will always remain parallel to their original configuration and will never skew or assume angular positions on the viewing screen whereby reading thereof will become difficult or impossible. This is an excellent feature and enables the rapid shifting from one microfilm frame to another with a minimum of effort and time without any loss in accuracy or alignment of the successive images on the screen.

Thus, if a microfilm record sheet S is placed in the plate carrier and it is desired to read from image to image along the long axis of the base sheet B, the plate carrier 42 is moved from side to side by a sliding movement of the compound bearing holders 131 along the rods 134 in bearings 126. When it is desired to shift to the next row of microfilm images on the base sheet, the plate carrier is moved in the desired direction in or out by a sliding of the rods 130 within the bearings 125 of the compound bearing holders 131. The entire record of the complete transaction is placed on one unit sheet whereby cumulative microfilm records may be conveniently read by a unit system.

It must therefore be appreciated that the present invention provides a unit system reader for a cumulative microfilm record sheet or the like whereby the images thereon relate to one particular matter or transaction and thus may easily be considered and compared successively in the reader without involving the use of complicated spindles and threading or guiding mechanism. Additionally, each separate matter may be considered in the reader without tying up the use of any other non-related matter and thus reduces the handling and the wear and tear involved on the microfilm records.

While we have shown and described what we believe to be a preferred embodiment of our invention in the matter of simplicity and durability of construction and ease of operation, it will be obvious that the details of such illustrated construction may be more or less modified within the spirit and scope of the claims without departure from the principles of construction or material sacrifice of the advantages of the preferred design.

We claim:

1. A microfilm reader comprising a source of light; a viewing screen; an optical system for conducting light from said source through a microfilm transparency and projecting the same onto said screen; a carrier having a rigid transparent plate for supporting a plurality of microfilm transparencies to be selectively viewed; means for mounting said carrier for universal movement in a predetermined plane reltaive to said optical system to bring into the range thereof a desired transparency or portion thereof; and an enclosing casing for said light source, optical system and carrier mounting means and for supporting said screen in upright position, said casing having a horizontal slot at its front portion for completely receiving said carrier therein in storage position, and said carrier having a handle projecting through said slot when the carrier is in storage position, and said mounting means including means for controllably supporting said carrier for scanning movement and for movement outwardly through said slot in the casing to a completely uncovered position to conveniently receive microfilm transparencies.

2. A microfilm reader comprising a source of light; a viewing screen; an optical system for conducting light from said source through a microfilm transparency and projecting the same onto said screen; a carrier having a rigid transparent plate for supporting a plurality of microfilm transparencies to be selectively viewed; means for mounting said carrier for universal movement in a predetermined plane relative to said optical system to bring into the range thereof a desired transparency or portion thereof; and a casing enclosing said light source and optical system and supporting said screen in upright position, said casing having a horizontal slot at its front portion, said mounting means including guided carriage means for controllably supporting said carrier for scanning movement in the slot so as to maintain the transverse axis of the carrier parallel to the transverse axis of the viewing screen and for movement outwardly through said slot in the casing to a completely uncovered position to conveniently receive microfilm transparencies, said guided carriage means extending through said slot for the said uncovered position of the carrier.

3. A microfilm reader comprising a source of light; a viewing screen; an optical system for conducting light from said source through a microfilm transparency and projecting the same onto said screen; a carrier having a frame and a pair of rigid transparent superposed plates for receiving between them a plurality of microfilm transparencies to be selectively viewed; means mounting one plate on the frame for movement between positions against and away from the other plate; means permanently securing and mounting said carrier for universal movement in a predetermined plane relative to said optical system to bring into the range thereof a desired transparency or portion thereof; and a casing enclosing said light source and optical system and supporting said screen in upright position, said casing having a horizontal slot at its front portion, said mounting means including means for controllably supporting said carrier for scanning movement and for movement through said slot in the casing to a position to conveniently receive microfilm transparencies between said separable plates.

4. The invention as defined in claim 3 in which the carrier has extending through said slot in the casing a handle by which the carrier may be manually moved to bring the desired portion of the transparent plate of the carrier into the range of the optical system; and means controlled by said handle to press the transparencies received between said plates into a planar configuration.

5. A microfilm reader comprising a source of light; a viewing screen; a pivotal mounting for said viewing screen whereby it may be removed to permit access into the upper inside portion of said reader above the hereinafter mentioned partition plate, an optical system for conducting light from said source through a microfilm transparency and projecting the same onto said screen; said reader having a casing enclosing said light source and optical system and supporting said screen in upright position; a light shielding hood adjacent said screen; means mounting said hood for sliding movement from within said casing to a position exterior of said casing to darken the space immediately in front of said screen; storage pockets formed in said casing on either side of said viewing screen; a facing strip extending across the face of said casing, said facing strip having an opening therein, said optical system having a focusing knob protruding through said opening for manipulation by the operator to focus the projection of the microfilm transparency on the screen, said casing having a horizontal slot therein below said facing strip which forms the upper edge of said slot; a carrier mounted in said slot and having a rigid transparent plate for supporting a plurality of microfilm transparencies to be selectively viewed; mounting means for said carrier including means for controllably supporting said carrier so as to maintain the transverse axis thereof parallel to the transverse axis of the viewing screen for scanning movement and for movement outwardly through said slot in the casing to a position to conveniently receive microfilm transparencies; a partition plate located below said slot and forming the lower surface of said slot and providing a bearing surface for said carrier; a front panel forming the lowermost front portion of the reader; and a hinged mounting for said front panel whereby it may be swung outwardly and away from said casing to permit access into the lower inside portion of said reader below said partition plate.

6. A reader comprising a source of light; a casing having a front opening; a viewing screen; a mounting for said viewing screen removably supporting the screen in said front opening to give access to the upper inside portion of said reader above the hereinafter mentioned partition plate; an optical system for conducting light from said source to a photographic transparency and projecting the same onto said screen, said casing enclosing said light source and optical system; a light shielding hood mounted for movement from a position within said casing to a position exterior thereof to shield the screen from incidental light in front of said screen, said casing having pockets formed therein adjacent said viewing screen for holding photographic transparencies for convenient use; a facing strip extending across the face of said casing, said facing strip having an opening, said optical system including a focusing knob protruding through said opening to the front of the casing adjacent said screen, said casing having a front slot below said screen; a carrier mounted in the casing and supporting a plurality of photographic transparencies to be selectively viewed; mounting means for said carrier including means for controllably supporting said carrier for scanning movement and for movement outwardly through said slot in the casing to a position to conveniently receive photographic transparencies; a partition plate located below said slot and forming the lower surface of said slot and providing a bearing surface for said carrier; and a front panel forming the lowermost front portion of the reader mounted for movement outwardly and away from said casing to give access to the lower inside portion of said reader below said partition plate.

7. A reader comprising a source of light; a casing having a front opening; a viewing screen; a mounting for said viewing screen removably supporting the screen in said front opening to give access to the upper inside portion of said reader above the hereinafter mentioned partition plate; an optical system for conducting light from said source to a photographic transparency and projecting the same onto said screen, said casing enclosing said light source and optical system, said casing having pockets formed therein adjacent said viewing screen for holding photographic transparencies for convenient use, said optical system including a focusing knob protruding through an opening to the front of the casing adjacent said screen, said casing having a front slot below said screen; a carrier mounted in the casing and supporting a plurality of photographic transparencies to be selectively viewed; mounting means for said carrier including means for controllably supporting said carrier for scanning movement and for movement outwardly through said slot in the casing to a position to conveniently receive photographic transparencies; and a partition plate located below said slot and forming the lower surface of said slot and providing a bearing surface for said carrier.

8. A reader comprising a source of light; a casing having a front opening; a viewing screen; a mounting for said viewing screen removably supporting the screen in said front opening to give access to the upper inside portion of said reader; an optical system for conducting light from said source to a photographic transparency and projecting the same onto said screen, said casing enclosing said light source and optical system, said casing having pockets formed therein adjacent said viewing screen for holding photographic transparencies for convenient use, said optical system including a focusing knob protruding through an opening to the front of the casing adjacent said screen, said casing having a front slot below said screen; a carrier mounted in the casing and supporting a plurality of photographic transparencies to be selectively viewed; and mounting means for said carrier including means for controllably supporting said carrier for scanning movement and for movement outwardly through said slot in the casing to a position to conveniently receive photographic transparencies.

9. A reader comprising a source of light; a casing having a front opening; a viewing screen; a mounting for said viewing screen removably supporting the screen in said front opening to give access to the upper inside portion of said reader; an optical system for conducting light from said source to a photographic transparency and projecting the same onto said screen, said casing enclosing said light source and optical system, said casing having pockets formed therein adjacent said viewing screen for holding photographic transparencies for convenient use, said casing having a front slot below said screen; a carrier mounted in the casing and supporting a plurality of photographic transparencies to be selectively viewed; and mounting means for said carrier including means for controllably supporting said carrier for scanning movement and for movement outwardly through said slot in the casing to a position to conveniently receive photographic transparencies.

References Cited in the file of this patent

UNITED STATES PATENTS

| Number | Name | Date |
|---|---|---|
| 1,987,067 | Leavitt | Jan. 8, 1935 |
| 2,163,593 | Draeger | June 27, 1939 |
| 2,226,618 | Kuppenbender | Dec. 31, 1940 |
| 2,256,178 | Stuart | Sept. 16, 1941 |
| 2,260,552 | Boni | Oct. 28, 1941 |
| 2,353,241 | Hughey | July 11, 1944 |
| 2,477,923 | Fitt | Aug. 2, 1949 |
| 2,484,448 | Cook | Oct. 11, 1949 |
| 2,501,453 | Rowe | Mar. 21, 1950 |
| 2,511,646 | Marmour | June 13, 1950 |
| 2,573,278 | Rowe | Oct. 30, 1951 |